United States Patent
Poeppelmann et al.

(10) Patent No.: US 12,126,738 B2
(45) Date of Patent: Oct. 22, 2024

(54) PROVIDING A CHALLENGE TO A DEVICE

(71) Applicant: Infineon Technologies AG, Neubiberg (DE)

(72) Inventors: Thomas Poeppelmann, Munich (DE); Wieland Fischer, Munich (DE); Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 207 days.

(21) Appl. No.: 17/381,580

(22) Filed: Jul. 21, 2021

(65) Prior Publication Data

US 2022/0029833 A1 Jan. 27, 2022

(30) Foreign Application Priority Data

Jul. 24, 2020 (DE) .......................... 102020119578.8

(51) Int. Cl.
| | |
|---|---|
| *H04L 29/06* | (2006.01) |
| *G06F 21/00* | (2013.01) |
| *H04L 9/08* | (2006.01) |
| *H04L 9/30* | (2006.01) |
| *H04L 9/32* | (2006.01) |

(52) U.S. Cl.
CPC .......... *H04L 9/3271* (2013.01); *H04L 9/0869* (2013.01); *H04L 9/3066* (2013.01); *H04L 9/3263* (2013.01)

(58) Field of Classification Search
None
See application file for complete search history.

(56) References Cited

U.S. PATENT DOCUMENTS

| | | | | |
|---|---|---|---|---|
| 9,154,480 B1 * | 10/2015 | Juels | ..................... | H04L 9/3271 |
| 10,356,088 B1 | 7/2019 | Peddada et al. | | |
| 2005/0123133 A1 * | 6/2005 | Stewart | ............... | H04L 63/0428 |
| | | | | 380/46 |
| 2006/0087407 A1 * | 4/2006 | Stewart | .................. | G06K 17/00 |
| | | | | 340/572.1 |
| 2010/0153719 A1 * | 6/2010 | Duc | ..................... | H04L 9/0838 |
| | | | | 713/168 |
| 2018/0343123 A1 * | 11/2018 | Liu | ........................ | H04L 9/3247 |
| 2019/0138753 A1 * | 5/2019 | Wallrabenstein | ..... | H04L 9/0866 |
| 2019/0258830 A1 * | 8/2019 | Edwards | ................ | G06F 21/76 |
| 2020/0089149 A1 * | 3/2020 | Antonio | ............ | G03G 21/1892 |

(Continued)

FOREIGN PATENT DOCUMENTS

EP  1933497 A1 *  6/2008  ............. H04L 9/085

OTHER PUBLICATIONS

H. Bock, et al., "A Milestone Towards RFID Products Offering Asymmetric Authentication Based on Elliptic Curve Cryptography", 14 pgs., http://citeseerx.ist.psu.edu/viewdoc/download?doi=10.1.1.453.9024&rep=1&type=pdf.

(Continued)

*Primary Examiner* — Lisa C Lewis
(74) *Attorney, Agent, or Firm* — Banner & Witcoff Ltd.

(57) ABSTRACT

A method for providing challenges to a device comprising (i) compiling a first challenge based on a first random value and a parameter; (ii) compiling a second challenge based on a second random value, the parameter and based on the first challenge or any intermediate result thereof; and (iii) providing the first challenge and the second challenge to the device.

20 Claims, 5 Drawing Sheets

(56) References Cited

U.S. PATENT DOCUMENTS

2020/0401533 A1* 12/2020 Golov ................. G06F 12/1466
2022/0114264 A1* 4/2022 Ellis, Jr. .................. G06F 21/44

OTHER PUBLICATIONS

M. Braun, et al., "Using Elliptic Curves on RFID Tags", 9 pgs., International Journal of Computer Science and Network Society, vol. 8, No. 2, Feb. 2008.

Office Action dated Jul. 9, 2021 for German Patent Application No. 102020119578.8.

* cited by examiner

PROVIDING A CHALLENGE TO A DEVICE

TECHNICAL FIELD

Aspects of the present disclosure relate to an approach to conduct a security-relevant communication between a host and a device utilizing at least one challenge supplied by the host.

SUMMARY

The objective is to improve existing solutions and in particular to improve existing validation concepts.

This is solved according to the features of the independent claims. Further aspects result from the depending claims.

The examples suggested herein may in particular be based on at least one of the following solutions. Combinations of the following features may be utilized to reach a desired result. The features of the method could be combined with any feature(s) of the device, apparatus or system or vice versa.

A method is suggested for providing challenges to a device: compiling a first challenge based on a first random value and a parameter, compiling a second challenge based on a second random value, the parameter and based on the first challenge or any intermediate result thereof, and providing the first challenge and the second challenge to the device.

The random value may in particular be selected in a way that it is not known to an attacker and that the attacker cannot predict the value with reasonable computational effort. Such value may be based on at least one of the following: a true-random value, a pseudo-random value or a deterministic value with a predetermined distribution. The random value may in particular has a predetermined level of entropy.

According to an aspect, compiling of the first challenge is based on an exponentiation in a finite group comprising a basis and an exponent, wherein the basis of the exponentiation in the finite group is based on the parameter, and wherein the exponent of the exponentiation in the finite group is based on the first random value.

According to an aspect, compiling of the second challenge is based on a further exponentiation in a finite group, wherein the basis of the further exponentiation is based on the parameter and the first challenge, and wherein the exponent of the further exponentiation is based on the second random value.

According to an aspect, the finite group is an elliptic curve.

According to an aspect, the finite group is a subgroup of the multiplicative group of a finite field.

According to an aspect, the exponentiation in the finite group comprises at least on operation in a polynomial ring.

According to an aspect, the second random value has a reduced size compared to the first random value.

According to an aspect, the device is authenticated to a host several times based on the at least two challenges.

According to an aspect, the method further comprises: compiling the first challenge based on the first random value, providing the first challenge to the device, receiving a first response from the device, authenticating or not authenticating the device based on the first response, compiling the second challenge based on a second random value, providing the second challenge to the device, receiving a second response from the device, and authenticating or not authenticating the device based on the second response.

According to an aspect, the method further comprises: receiving a certificate from the device, obtaining a public key of the device based on the certificate in case the certificate is successfully verified, and using the public key of the device for authenticating the device based on the respective response provided by the device.

According to an aspect, the device is not authenticated if the first response is not received within a first time window and/or if the second response is not received within a second time window.

According to an aspect, the first time window and the second time window are of equal size or of different sizes.

According to an aspect, each time window is based on a timer set by the host before, when or after the respective challenge is sent to the device, and the respective time window is determined based on: the time when the timer is set, and a predetermined threshold time for the respective time window.

According to an aspect, authenticating or not authenticating the device comprises determining a first checkvalue based on a multiplication of the first random value with the public key of the device, authenticating the device based on a comparison between the first checkvalue and the first response, determining a second checkvalue based on a multiplication of the second random value with the first checkvalue, and authenticating the device based on a comparison between the second checkvalue and the second response.

According to an aspect, the respective response is compiled by a multiplication of a respective challenge with a secret key of the device.

According to an aspect, the respective response is determined based on at least one cryptographic operation.

According to an aspect, the sizes of the respective random values may vary.

According to an aspect, the method is used or executed on a security device or for operating a security device, wherein such security device comprises at least one of the following: an integrated circuit, a hardware security module, a trusted platform module, a crypto unit, a FPGA, a processing unit, a controller, and a smartcard.

According to an aspect, the device is a cryptographic device, which is attached to or embedded in a consumable.

Also, a host is suggested that is arranged to: compile a first challenge based on a first random value and a parameter, compile a second challenge based on a second random value, the parameter and based on the first challenge or any intermediate result thereof, and provide the first challenge and the second challenge to a device.

Further, a system is provided comprising a host and a device, wherein the host is arranged to: compile a first challenge based on a first random value and a parameter, compile a second challenge based on a second random value, the parameter and based on the first challenge or any intermediate result thereof, and provide the first challenge and the second challenge to the device, wherein the device is arranged to: compile a first response based on the first challenge received and compile a second response based on the second challenged received, provide the first response and the second response to the host, and wherein the host is further arranged to authenticate the device several times based on the at least two responses received from the device.

Also, a computer program product is provided, which is directly loadable into a memory of a digital processing device, comprising software code portions for performing the steps of the method as described herein.

BRIEF DESCRIPTION OF THE DRAWINGS

Aspects are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Examples described herein in particular refer to speed-up asymmetric device authentication, in particular authentication of low-cost devices.

One entity (also referred to as host) has to compute a challenge/response pair to authenticate another entity (also referred to as device, which may in particular be a consumable). Some use-cases require a fast authentication. Protocols conducting authentication may be based on or utilize public-key cryptography (e.g. RSA, DSA, or elliptic curve cryptography). The host and/or the device may be implemented in software or hardware or any combination thereof.

The consumable may provide something for the host "to consume". There exist many examples of combinations for consumable-host-pairs, e.g., printing cartridge—printer, battery—device using the battery, refill cartridge—electronic cigarette, credit balance card—prepaid handy, coffee capsule—coffee maker, filter cartridge—water filter, medical supply—medical device.

The consumable may be physically connectable to the host. The host may be configured to authenticate the consumable and the host may be further configured to utilize the consumable only in case of a successful authentication.

A crypto engine may be attached to the consumable. The crypto engine may provide, e.g., a signature, to the host.

State-of-the-art techniques may use a full length entropy at the host to compute challenge/response pairs which may result in long authentication times (e.g., at device startup) or expensive host devices providing high performance (processing power).

$(G,*)$ may be a multiplicatively written group wherein a discrete logarithm problem is hard. Further, $g \in G$ is considered a generator of a large prime order subgroup $<g>$ of $G$. A party Bob has a secret/public key pair $(q, Q)$, wherein
$0 \leq q < |<g>|$ is a randomly chosen number and
$Q = g^q$,
and a certificate Z for his public key Q is signed by a trusted authority which has issued the certificate Z for the public key Q.

A state-of-the-art Diffie-Hellman-based public-key authentication protocol comprises the following steps involving the two parties Bob and Alice:

(1) Bob sends his public key Q and the corresponding certificate Z to Alice.
(2) Alice verifies the validity of the certificate (i.e., hashes the public key Q and verifies the digital signature of the certificate Z using a known public key of the trusted authority).
(3) Alice randomly chooses a number $0 \leq \lambda < |<g>|$, computes a challenge $c = g^\lambda$ and a corresponding response $r = Q^\lambda$, and sends the challenge c to Bob.
(4) After having received the challenge c, Bob computes $s = c^q$ and sends s back to Alice.
(5) Alice compares r and s: If r=s the authentication was successful, otherwise the authentication fails.

If Bob knows the secret key q (i.e., the discrete logarithm of its certified public key Q) then the following identities hold $$s = c^q = (g^\lambda)^q = g^{\lambda * q} = g^{q * \lambda} = (g^q)^\lambda = Q^\lambda = r$$

and the authentication succeeds.

Otherwise, the security relies on the assumed difficulty of computing discrete logarithms within the group G. In addition to the assumed hardness of the discrete logarithm problem in G the random number $\lambda$ needs to be re-generated and needs to be unpredictable. Hence, a cryptographically strong true or pseudo random number (TRNG or PRNG) may be used and the random number $\lambda$ has a so-called efficient entropy. Otherwise, dictionary and replay attacks may successfully attack the authentication protocol.

This Diffie-Hellman-based public-key authentication protocol has the disadvantage that the verifier Alice bears a high computational burden: the verification of the digital signature on the certificate Z and the computation of a fresh challenge c as well as the corresponding response r are computationally expensive tasks, which may involve thousands of multiplications of long integer numbers. Further, the random number $\lambda$ may preferably be large and shall have a high degree of entropy (i.e. randomness). The quality of the random number $\lambda$ may have an immediate impact on the quality of the authentication.

Solutions described herein allow computing challenges and verifying responses in a more efficient way. In particular, Diffie-Hellman-based public-key authentication protocols may be used.

Examples described herein suggest efficiently re-using randomness to authenticate multiple devices or by accumulating randomness when several authentications are performed after each other.

A basic motivation for the examples described herein is to protect products from being cloned or counterfeited. Counterfeiting is the act of imitating a product by non-authorized third parties. This is often used when a cheaper product and/or a product of lesser quality is offered to replace the original product. Protection of the original product may be achieved via an authentication mechanism that is supplied to the original product. This authentication mechanism can be part of the original product or it may be provided as an authentication device (e.g., crypto engine) that is embedded in or connected to the original product. The authentication mechanism may in particular be an asymmetric binary elliptic-curve based authentication.

As an option, additional information, e.g., a counter value may be included. Such counter value may be used to store a number of consumables expected. The counter may in this regard be an ink counter if the original product is an ink cartridge for a printer. Also, the additional information may be or comprise a remaining lifetime of a device (e.g., consumable).

Each authentication device may contain a unique public and private key which may be generated and provided to the device by a protected environment, e.g., during manufacturing. The public key may be signed by a digital signature to form a digital certificate.

The host is able to verify the integrity and authenticity of the device's certificate and the contained data using publicly available data, i.e., the certificate's public key.

The authentication device may be able to prove to the host that it is in possession of the private key that corresponds to the public key in the certificate by using an asymmetric authentication protocol. The advantage of such approach is that no secret data (from the device) is required by the host.

The authentication device may be used to protect consumables, e.g., printer cartridges, medical supplies, or batteries from counterfeit.

A basic authentication protocol that can be used with binary or prime elliptic curves over $GF(2^n)$ is known, e.g., from [H Bock, M Braun, M Dichtl, E Hess, J Heyszl, W Karg, Koroschetz, B Meyer, and H Seuschek. A milestone towards RFID products offering asymmetric authentication based on elliptic curve cryptography, see http://citeseerx.ist.psu.edu/viewdoc/download?doi=10.1.1.453.9024&rep=rep1&type=pdf] or [International Journal of Computer Science and Network Security 2 (2008): 1-9, see http://citeseerx.ist.psu.edu/viewdoc/download?doi=10.1.1.126.555&rep=rep1&type=pdf]

It is noted that a cryptographic hardness of elliptic curve cryptography (ECC) is based on the discrete logarithm problem. More specifically, the fact is used that an attacker cannot determine a secret s when given a public key $T=sP$, wherein P is a point on a suitably chosen elliptic curve, s is a binary string representing an integer number, and sP is the point resulting from a scalar or point multiplication defined over the particular curve.

An authentication protocol between a device (prover) and a host (verifier) could be described as follows:

(1) Select an elliptic curve E and a base point P.
(2) Determine a private key from a random binary value $\xi^T$.
(3) Determine a public key T as follows: $T=\xi^T \cdot P$.

The public key T is the result of a point multiplication. Due to the hardness of the discrete logarithm problem, it is (i.e. has to be) difficult ("hard") to extract the private key $\xi^T$ from the public key T.

With the following protocol steps the device can prove to the host the possession of the private key $\xi^T$:

(1) The host chooses a random value λ and computes a challenge $C=\lambda \cdot P$.
(2) The host sends the challenge C to the device which possesses the private key $\xi^T$.
(3) The device determines and returns a response $R=\xi^T \cdot C$.
(4) The host checks whether a checkvalue $C'=\lambda \cdot T$ equals the response R obtained from the device.

This protocol works as $$R = C \cdot \xi^T = \xi^T \cdot \lambda \cdot P$$

and $$C' = \lambda \cdot T = \xi^T \cdot \lambda \cdot P,$$

based on the fact that the public key T has been determined on the private key $\xi^T$ and the point P, i.e. $T=\xi^T \cdot P$ as stated above.

Due to the hardness of the discrete logarithm problem, it should not be feasible to extract the private key $\xi^T$ from the response R.

Hence, the device is able to prove to the host that it has knowledge of the private key $\xi^T$ and that the private key $\xi^T$ was used to generate the public key T.

Another approach by an attacker to break the authentication scheme instead of trying to extract the private key $\xi^T$ is to guess the random value λ. If successful, the attacker would then be able to compute the response $R=\lambda \cdot T$ without having to know the private key $\xi^T$. Therefore, it is beneficial to choose the challenge C from a full range of points within a subgroup <P> of the elliptic curve/base field. For example, with regard to a 256-bit elliptic curve, a 256-bit scalar may be used as random value λ during the computation of the challenge $C=\lambda \cdot P$.

The authenticity of the public key T can be achieved irrespective of this protocol by using digital certificates or other means. This may be beneficial as devices may be equipped with a device-individual public key. A digital certificate may comprise a device-individual public key T and a universal identification (UID) and it may be signed by a secret key $s_{Cert}$ that is only known to the vendor of the authentication chip (i.e. the device). The host may be equipped with a public key $pk_{Cert}$ and can thus verify the validity of the digital certificate and verify that the public key T is authentic. This ensures that the secret key $s_{Cert}$ was generated by the vendor and not by an attacker.

As described, the host has to perform one scalar multiplication to compute the challenge:

$$C = \lambda \cdot P. \quad (1)$$

Moreover, the host computes a checkvalue that is required to check the validity of the response with another scalar multiplication $$C' = \lambda \cdot T. \quad (2)$$

These computations (1) and (2) are expensive and require (a significant amount of) time to be completed.

Establish Time Window

It is in particular suggested reducing the length of the random value λ, which may be provided by the host and to require the device to provide the response within a predefined time ρ (i.e. establishing a time window).

As an option, the random value λ may comprise a number of σ-bits, wherein σ may be an integer that is smaller than the logarithm of the order of the point group of the underlying elliptic curve. In such case, the underlying discrete logarithm problem is simplified.

A notation $\lambda \leftarrow [0, 2^\sigma - 1]$ indicates a random sampling of a scalar λ (here the random number) in the range from zero to $2^\sigma - 1$. In this case, the scalar λ is σ-bits long.

According to an exemplary additional requirement, the device has to respond within a predetermined amount of time. This results in a limited time window for the device to determine, compile and provide the response R to the host. This time limitation is advantageous, because an attacker without knowledge of the secret key has only limited time to come up with a suitable response, which may be particularly unlikely considering the hardness of the discrete logarithm problem. This time limitation may utilize a smaller random number λ, which results in a reduced runtime to compile the challenge C as well as the checkvalue C'. In other words, as the attacker has less time to break the discrete logarithm problem, the length of the random number λ may be reduced.

Figure 1:
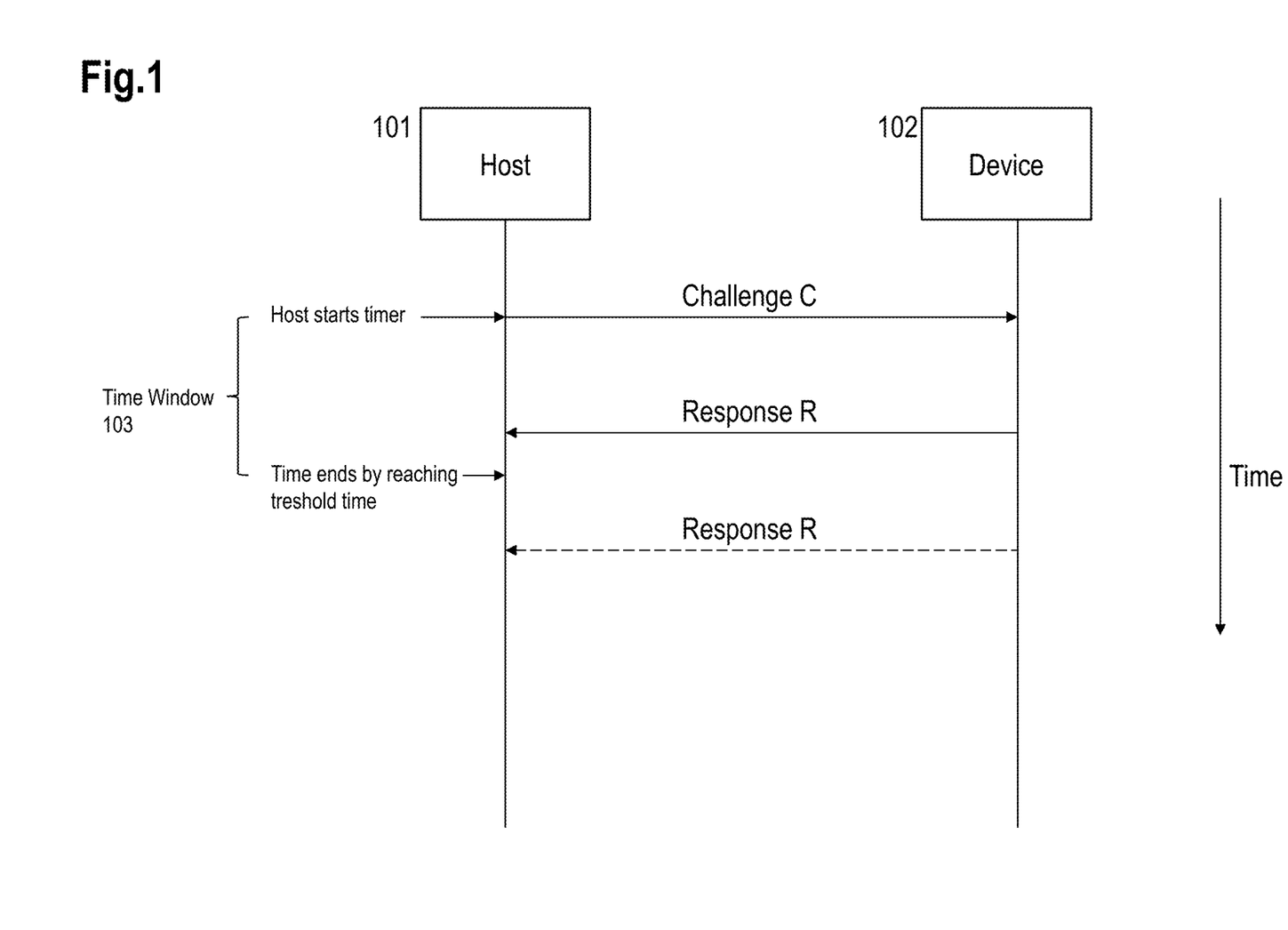
FIG. 1 shows a schematic diagram illustrating the communication between a host (i.e. the verifier) and a device (i.e. the prover, e.g., a consumable)

FIG. 1 shows a schematic diagram illustrating the communication between a host 101 (i.e. the verifier) and a device 102 (i.e. the prover, e.g., a consumable). Reference is also made to the explanations provided above.

The host 101 chooses the random value A and determines the challenge C. The host 101 then transmits the challenge C to the device 102 and starts a timer (or vice versa first start the timer and then transmit the challenge C).

Upon receiving the challenge C, the device 102 compiles a response R using its private key $\xi_T$. The device 102 transmits the response R to the host 101.

If the response R is received with a time window 103, which can be determined based on the timer and a threshold time, the host 101 processes the response R. Otherwise, if the response R is received after the timer has reached the threshold time (see dashed response R in FIG. 1), a predetermined action may be triggered, e.g., an alarm can be issued and the response R may not be considered valid and (optionally) hence not be further processed.

Any response R arriving at the host 101 too late (i.e. later than a predetermined time defined set by the time window 103) results in the device 102 not being authenticated to the host (based on this response R).

If the response R arrives at the host 101 within the defined time window, the response R is processed, i.e. the host 101 checks whether the checkvalue C'=λ·T equals the response R obtained from the device 102. If this is true, the device 102 has been successfully authenticated. Otherwise, the device 102 has not been authenticated to the host 101.

Variation A: Multiple Authentications With Timer

In an exemplary system, a printer may be a host to which multiple devices (e.g., ink cartridges of different colors) are to be connected. Each of the multiple devices may be an ink cartridge of a predefined color to which a crypto engine (acting as the device participating in the communication with the host) may be embedded or attached. Each ink cartridge is thus an exemplary aspect of a device (consumable) to be authenticated to the printer (host) to avoid counterfeiting.

When the printer is switched on, the devices need to be authenticated within a short period of time. After successful authentication of all devices, the printer (host) may enter its operational state. Otherwise, the printer may issue a failure notification not being operational due to at least one invalid ink cartridge.

Figure 2:
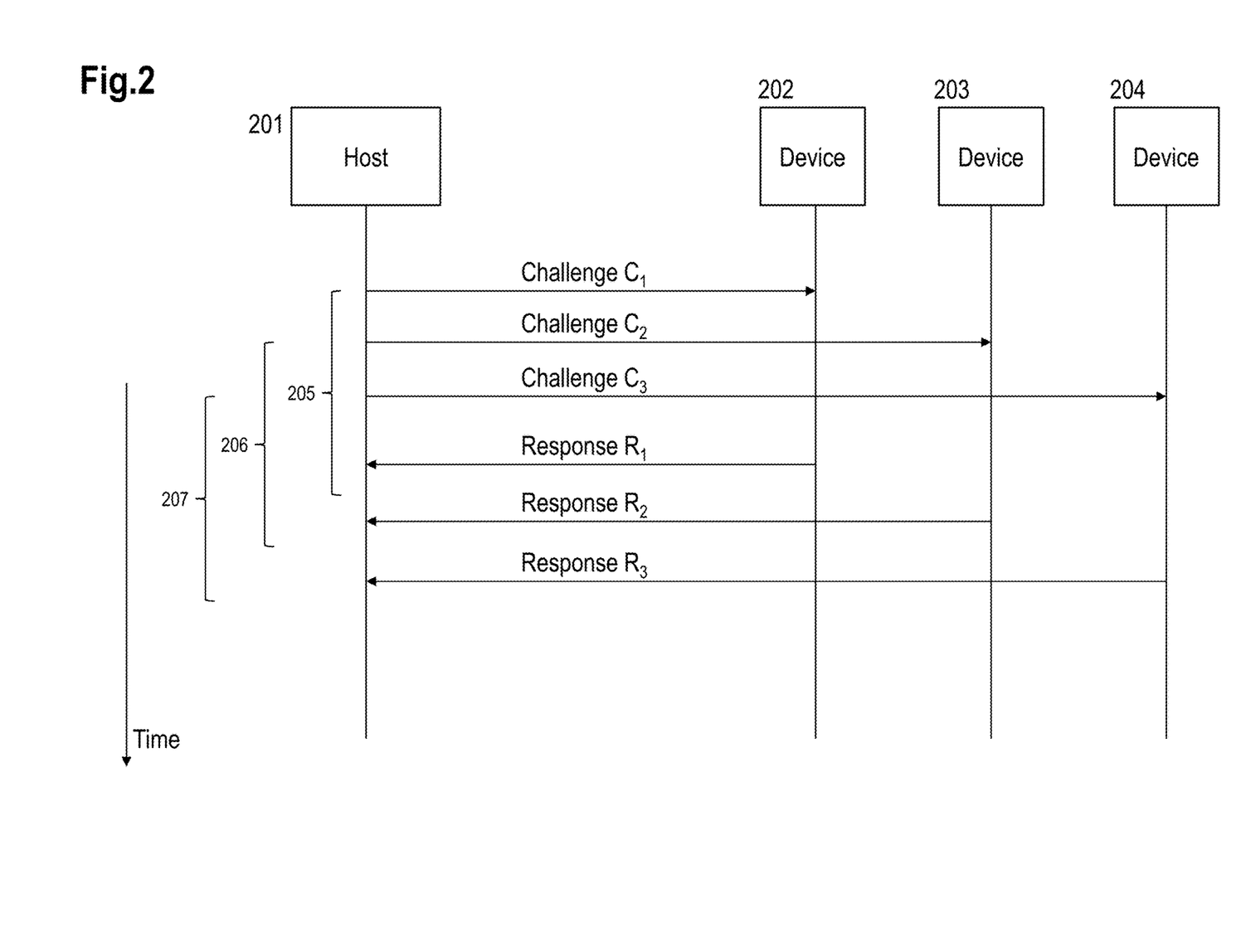
FIG. 2 shows an exemplary scenario with a host that communicates with three devices, wherein the host may be a printer and each of the devices may be an ink cartridges of different color.

FIG. 2 shows an exemplary scenario with a host 201 that communicates with three devices 202 to 204. The host 201 may be a printer and each of the devices 202 to 204 may be an ink cartridges of different color. Each device 202 to 204 may have its own key-pair (private and public key), wherein only the respective private key is a secret.

The host 201 may generate a challenge $C_1=\lambda_1 \cdot P$ and a checkvalue $C'_1=\lambda_1 \cdot T_1$ for a random value $\lambda_1 \leftarrow [0,2^\sigma-1]$ for the device 202. Accordingly, the host 201 determines challenges $C_2$ and $C_3$ as well as checkvalues $C'_2$ and $C'_3$ based on random values $\lambda_2$ and $\lambda_3$ for the devices 203 and 204.

The host 202 may reduce the length of the random values $\lambda_1, \lambda_2, \lambda_3$ to $\sigma$ bits. Also, the host 202 may only limit the response time for each of the devices 202 to 204 by establishing a time window 205 within a response $R_1$ from the device 202 is expected; by establishing a time window 206 within a response $R_2$ from the device 203 is expected; and by establishing a time window 207 within a response $R_3$ from the device 204 is expected.

Each time window 205 to 207 may be initiated by starting a timer when (or after) the host 201 sent the respective challenge $C_1$, $C_2$, $C_3$ to the respective device 202, 203, 204. The end of the time window 205 to 207 is determined by a threshold time that is added to the starting time of the timer. The timers thus ensure that each of the devices 202 to 204 sends its response within the respective time window (and that the response also arrives within the respective time window). Otherwise, the response may not be considered valid and the respective device 202 to 204 cannot be successfully authenticated to the host 202.

As an option, instead of using three different challenges for the devices 202 to 204, the same challenge may be sent to all the devices 202 to 204.

As is shown in FIG. 2, the processing of the challenges and/or response can be performed at least partially in parallel, i.e. with a partial time-overlap. For example, the checkvalues can be determined upon receipt of the respective response (if the response has been received within the permitted time window).

Variation B: Multiple Authentications With Dependent Challenges

The example of Variant A (a printer acting as host to authenticate (or not) three ink cartridges as devices) may be applied to illustrate an optional dependency between the challenges provided by the host.

The host 201 may determine a random value $$\lambda_1 \leftarrow [0,2^\alpha-1]$$

for an integer α, compute a challenge $$C_1 = \lambda_1 \cdot P$$

and send it to the device 202. The host 201 may then select a random value $$\lambda_2 \leftarrow [0,2^\beta-1]$$

for an integer β, wherein β<α, compute a challenge $$C_2 = \lambda_2 \cdot C_1$$

and send it to the device 203. Then, the host 201 may select a random value $$\lambda_3 \leftarrow [0,2^\beta-1],$$

compute a challenge $$C_3 = \lambda_3 \cdot C_2$$

and send it to device 204.

Subsequently, the host 201 may compute checkvalues $$C'_1 = \lambda_1 \cdot T_1,$$

$$C'_2 = (\lambda_1 \cdot \lambda_2 \bmod n) \cdot T_2$$

and $$C'_3 = (\lambda_1 \cdot \lambda_2 \cdot \lambda_3 \bmod n) \cdot T_3.$$

wherein $T_1$ is the public key of the device 202, $T_2$ is the public key of the device 203 and $T_3$ is the public key of the device 204. Further, n is the order of the subgroup <P> generated by the point P on the elliptic curve.

The host 201 may conduct the following sequence: compute the challenge $C_1$ and send it to the device 202, compute the checkvalue $C'_1$, check the response provided by the device 202 (if received in time), compute the challenge $C_2$ and send it to the device 203, compute the checkvalue $C'_2$, check the response provided by the device 203 (if received in time), compute the challenge $C_3$ and send it to the device 204, compute the checkvalue $C'_3$, and check the response provided by the device 204 (if received in time).

This solution might be advantageous as the runtime for the generation of the challenges is decreased. In the example shown above, instead of six full length scalar multiplications for challenges and checkvalues, the host 201 may only compute six σ-bit scalar multiplications in Variation A and only two α-bit scalar multiplications and four β-bit scalar multiplications in Variation B.

Using a "high entropy" challenge (α length) and several "low entropy" challenges that depend on the first challenge enables fast authentication of multiple devices without compromising the overall security of the approach.

Variation C: Incremental Challenge Generation for Authentication

For reasons of simplicity, only a single device is assumed in the following example. However, the concept may be applied accordingly to at least two devices.

Figure 3:
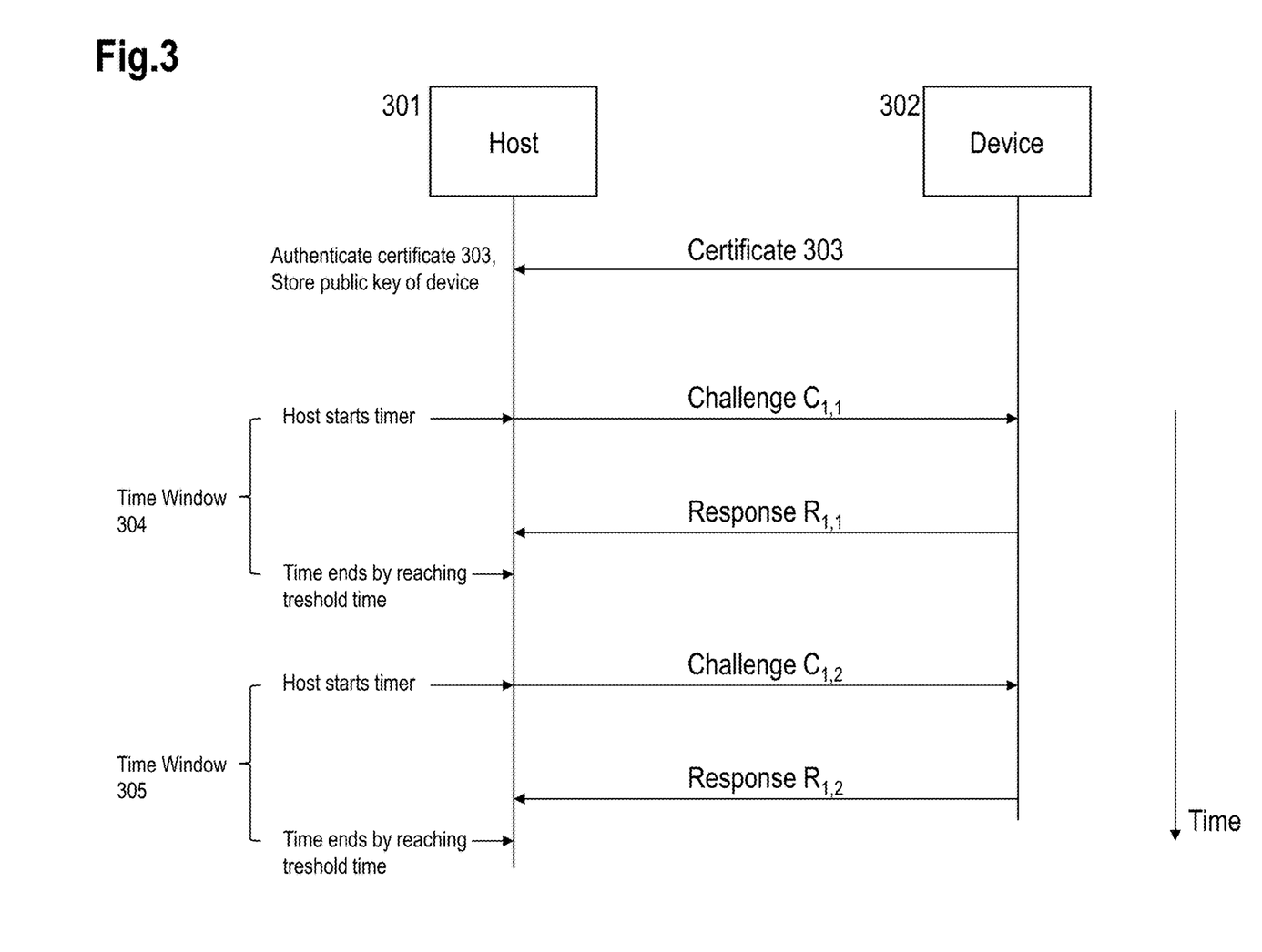
FIG. 3 shows an exemplary diagram of a repetitive authentication between a host and a device.

FIG. 3 shows an exemplary diagram of a repetitive authentication between a host 301 and a device 302.

For example, authenticating the device 302 may be split into two stages:

Stage 1: A certificate 303 is transmitted from the device 302 to the host 301. The host 301 verifies the public key $T_1$ (or a hash of it) of the device 302. If it can be successfully verified, the certificate is deemed authentic and the public key $T_1$ it is stored with the host.

Stage 2: This public key $T_1$ (or hash of it) is then used to authenticate the device 302 to the host 301 several times (e.g., periodically or based on any time pattern that may be deterministic, event-driven, condition-driven and/or at least partially arbitrary), e.g., every time (or every k-th time, k being an integer larger than one) a consumable is used.

After checking the certificate 303, the host 301 selects a random value $$\lambda_{1,1} \leftarrow [0, 2^\alpha - 1]$$

And generates a challenge $C_{1,1}$ for the device 302:

$$C_{1,1} = \lambda_{1,1} \cdot P.$$

The random value $\lambda_{x,y}$ indicates (this applies for all first and second indices) a device identification x, and an index y as a sequence of generated values, wherein y=1 is the first value, y=2 is the second value, etc.

In other words, the first index "1" shows the first device. As this example comprises merely a single device, the first index is set to "1". This example, however, can be easily extended to several devices, which would then use the first index "2" for the second device, etc.

The host 301 then sends the challenge $C_{1,1}$ to the device 302 and computes a checkvalue $C'_{1,1}$ based on the random value and the public key of the device:

$$C'_{1,1} = \lambda_{1,1} \cdot T_1.$$

The host 301 may use this checkvalue $C'_{1,1}$ to verify a first response $R_{1,1}$ obtained from the device 302 and thus determine whether the device 302 is authentic.

As an option, a time window 304 may be used as an additional requirement to be fulfilled in order to successfully authenticate the device 302 to the host 301, i.e. in such case, the host would require to receive the response $R_{1,1}$ within this time window 304.

The host 301 may store the challenge $C_{1,1}$ and the checkvalue $C'_{1,1}$ in a memory, e.g., a volatile (e.g., RAM) or a non-volatile memory (e.g., EEPROM or Flash).

For a subsequent authentication of the device 302 the host 301 may select a random value $$\lambda_{1,2} \leftarrow [0, 2^\beta - 1]$$

with β<α and compute a subsequent challenge $C_{1,2}$ based on this random value $\lambda_{1,2}$ and the stored challenge $C_{1,1}$ as follows:

$$C_{1,2} = \lambda_{1,2} \cdot C_{1,1}.$$

The random value $\lambda_{1,2}$ is a scalar of reduced size compared to the random value $\lambda_{1,1}$. The host 301 computes a checkvalue $C'_{1,2}$ $$C'_{1,2} = \lambda_{1,2} \cdot C'_{1,1},$$

which depends on the first check value $C'_{1,1}$ and the random value $\lambda_{1,2}$, which was also used to compile the challenge $C_{1,2}$.

The host 301 may use this checkvalue $C'_{1,1}$ to verify a subsequent response $R_{1,2}$ obtained from the device 302 and thus determine whether the device 302 is still authentic.

As an option, a time window 305 may be used as an additional requirement to be fulfilled in order to successfully authenticate the device 302 to the host 301, i.e. in such case, the host would require to receive the response $R_{1,2}$ within this time window 305. It is noted that the time window 305 may be of equal size or of different size compared to the time window 304. It is in particular an option that the time window 305 is smaller than the time window 304.

This approach may be continued accordingly for subsequent authentications producing subsequent challenges $C_{1,i}$, checkvalues $C'_{1,i}$ and responses $R_{1,i}$, wherein i in this example is an integer larger than 2.

As indicated above, the first index "1" indicates that the first (here a single) device 302 is affected. The solution may hence be accordingly applied to authenticating more than one device by the host 301. Such authenticating of several devices may be conducted sequentially or at least partially in parallel, i.e. in an at least partially timely overlapping manner.

This solution bears the advantage that at least subsequent challenges and check values are computed using the random value of a reduced length β (compared to the length α that has been used for the random value of the first challenge).

It is noted that the length of additional random values may be further reduced or varied. It is in particular an option that different length values $\beta_i$ (in this example, i being the second or any subsequent authentication of the device) are used for different authentications. These length values may vary, i.e. increase or decrease, in length (size), e.g. over time.

In an exemplary aspect an authentication protocol with a NIST P256 curve of 256-bit length may be used. The value of α may be chosen large for the first random value to prevent or impede a successful attack. Subsequent challenges may be generated based on a random value of reduced length β<α still providing a sufficient level of security against successful attacks. The value β may even be chosen in a range from 16 bit to 64 bit, which further results in more efficient scalar multiplications for generating the challenges and checkvalues.

An attacker monitoring the communication between the host and the device is only able to see the succession of challenges and responses and has no possibility to efficient extract any secret therefrom.

As an option the timer resulting in the time window to be checked by the host for each of the responses delivered by the device may be used to further increase the difficulty for a successful attack against the protocol. It is noted, however, that in particular if the scalar values ($\sigma$-bit, $\alpha$-bit and/or $\beta$-bit) comprise a high level of entropy, there may be no need for providing and such time window.

Further Implementation Examples

Figure 4:
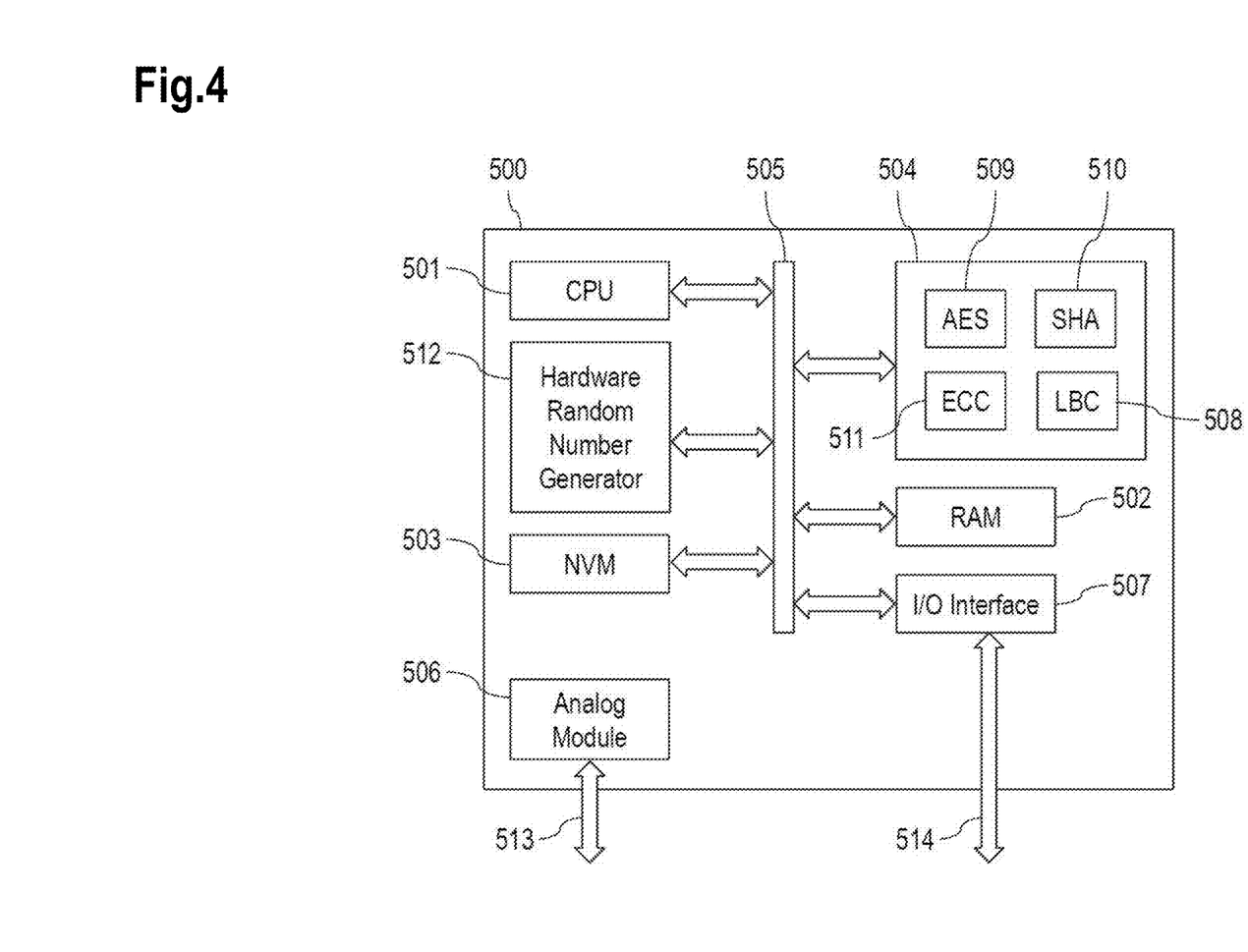
FIG. 4 shows an exemplary arrangement of a processing device comprising a CPU, a RAM, a non-volatile memory, a crypto module, an analog module, an input/output interface and a hardware-random number generator.

FIG. 4 shows a processing device 500 comprising a CPU 501, a RAM 502, a non-volatile memory 503 (NVM), a crypto module 504, an analog module 506, an input/output interface 507 and a hardware-random number generator 512.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are: an AES core 509, a SHA core 510, an ECC core 511, and a lattice-based crypto (LBC) core 508.

The lattice-based crypto core 508 may be provided in order to conduct or accelerate lattice-based cryptography.

The CPU 501, the hardware random number generator 512, the NVM 503, the crypto module 504, the RAM 502 and the input/output interface 507 are connected to the bus 505. The input output interface 507 may have a connection 514 to other devices, which may be similar to the processing device 500.

The crypto module 504 may or may not be equipped with hardware-based security features. As an option, the crypto module 504 may comprise a random number generator.

The analog module 506 is supplied with electrical power 513 via an electrical contact and/or via an electromagnetic field. This power is supplied to drive the circuitry of the processing device 500 and may in particular allow the input/output interface to initiate and/or maintain connections to other devices via the connection 514.

The bus 505 itself may be masked or plain. Instructions to process the steps described herein may in particular be stored in the NVM 503 and processed by the CPU 501. The data processed may be stored in the NVM 503 or in the RAM 502. Supporting functions may be provided by the crypto modules 504 (e.g., expansion of pseudo random data). Random numbers may be supplied by the hardware-random number generator 512.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

Figure 5:
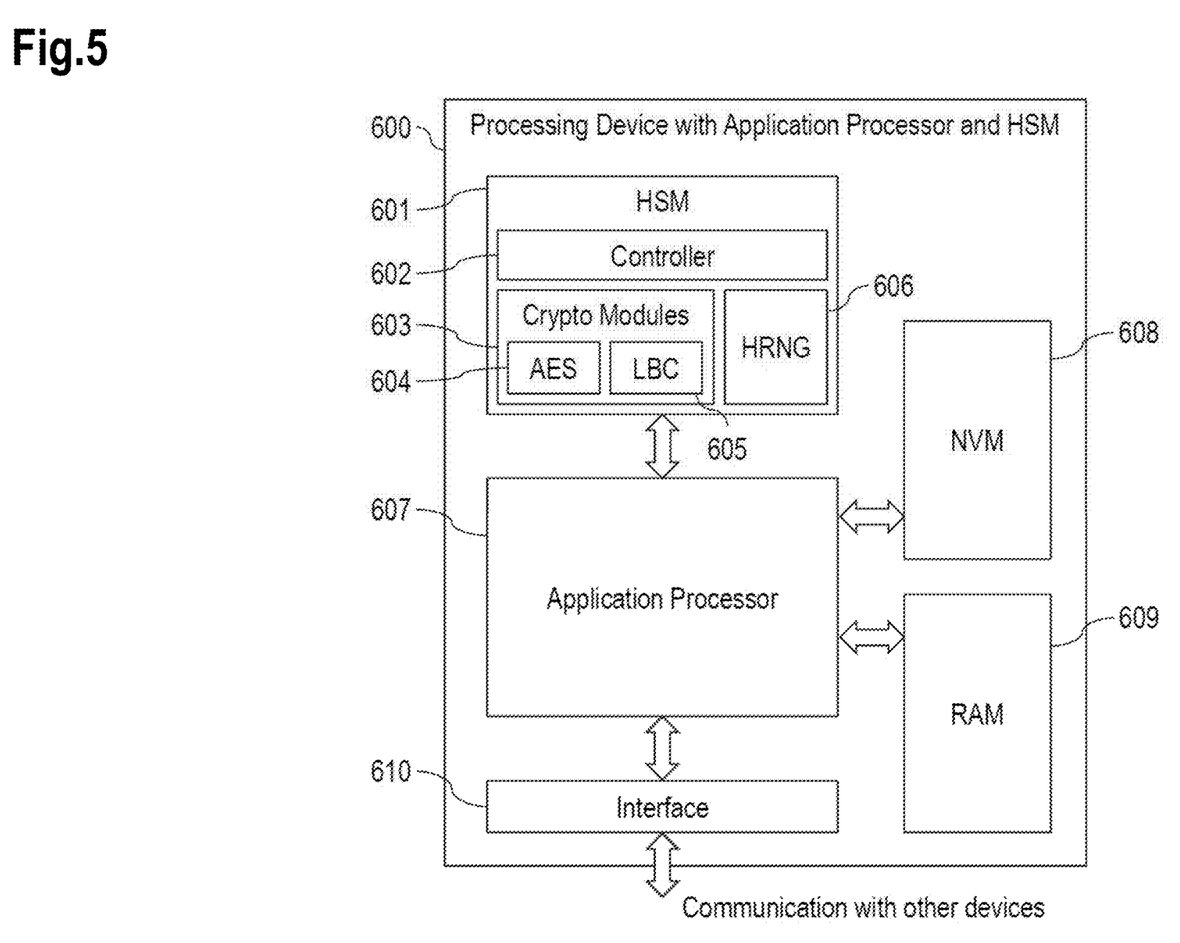
FIG. 5 shows an alternative arrangement with a hardware security module (HSM).

FIG. 5 shows another example of a processing device 600. The processing device 600 comprises a hardware security module 601, a non-volatile memory (NVM) 608, a random access memory (RAM) 609, an interface 610 for communication with other devices and an application processor 607, which is coupled with the hardware security module (HSM) 601, the RAM 609, the NVM 608 and the interface 610.

The HSM 601 comprises a controller 602, a hardware-random number generator (HRNG) 606 and at least one crypto module 603. The crypto module 603 exemplarily comprises an AES core 604 and a Lattice-based crypto (LBC) core 605.

According to one aspect, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary aspects of the disclosure have been disclosed, it will be apparent to those skilled in the art that various changes and modifications can be made which will achieve some of the advantages of the disclosure without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for providing challenges from a host to at least one device for authentication of the at least one device to the host, the method comprising:
    the host compiling a first challenge based on a first random value and a parameter, wherein the compiling of the first challenge is based on an exponentiation in a finite group comprising a basis and an exponent, the basis of the exponentiation in the finite group is based on the parameter, and wherein the exponent of the exponentiation in the finite group is based on the first random value;
    the host providing the first challenge to the at least one device;
    the host compiling a second challenge based on a second random value, the parameter, and based on the first challenge or any intermediate value generated as part of the compilation of the first challenge, wherein the second random value has a reduced size compared to the first random value;
    the host providing the second challenge to the at least one device or to another device for authentication of the at least one device or the other device to the host; and
    authenticating the at least one device or the other device based on a response to the second challenge.

2. The method according to claim 1,
    wherein compiling of the second challenge is based on a further exponentiation in the finite group,
    wherein the basis of the further exponentiation is based on the parameter and the first challenge, and
    wherein the exponent of the further exponentiation is based on the second random value.

3. The method according to claim 1, wherein the finite group is an elliptic curve.

4. The method according to claim 1, wherein the finite group is a subgroup of a multiplicative group of a finite field.

5. The method according to claim 1, wherein the exponentiation in the finite group comprises at least one operation in a polynomial ring.

6. The method according to claim 1, wherein the at least one device is authenticated to the host several times based on the at least two challenges.

7. The method according to claim 1, further comprising:
    receiving a first response from the at least one device;
    authenticating the device based on the first response;
    receiving a second response from the at least one device or the other device; and
    authenticating the at least one device or the other device based on the second response.

8. The method according to claim 7, further comprising:
    receiving a certificate from the at least one device;
    obtaining a public key of the at least one device based on the certificate in case the certificate is successfully verified; and
    using the public key of the at least one device for authenticating the at least one device based on the respective response provided by the at least one device.

9. The method according to claim 7, wherein the at least one device is not authenticated if the first response is not received within a first time window and/or if the second response is not received within a second time window.

10. The method according to claim 9, wherein the first time window and the second time window are of equal size or of different sizes.

11. The method according to claim 9, wherein
    each time window is based on a timer set by the host before, when or after the respective challenge is sent to the at least one device, and
    the respective time window is determined based on:
        the time when the timer is set; and
        a predetermined threshold time for the respective time window.

12. The method according to claim 8, wherein authenticating the at least one device comprises:
    determining a first checkvalue based on a multiplication of the first random value with the public key of the at least one device;
    authenticating the at least one device based on a comparison between the first checkvalue and the first response;
    determining a second checkvalue based on a multiplication of the second random value with the first checkvalue; and authenticating the at least one device based on a comparison between the second checkvalue and the second response.

13. The method according to claim 7, wherein the first or second response is compiled by a multiplication of the respective first or second challenge with a secret key of the at least one device.

14. The method according to claim 13, wherein the respective first or second response is determined based on at least one cryptographic operation.

15. The method according to claim 7, wherein sizes of the respective random values vary.

16. The method according to claim 7, wherein the method is used or executed on a security device or for operating the security device, wherein the security device comprises one or more of: an integrated circuit, a hardware security module, a trusted platform module, a crypto unit, a FPGA, a processor, a controller, and a smartcard.

17. The method according to claim 7, wherein the at least one device is a cryptographic device, which is attached to or embedded in a consumable.

18. A host comprising:
a memory arranged to store instructions; and
processing circuitry arranged to execute the instructions to:
  compile a first challenge based on a first random value and a parameter, wherein the compiling of the first challenge is based on an exponentiation in a finite group comprising a basis and an exponent, the basis of the exponentiation in the finite group is based on the parameter, and wherein the exponent of the exponentiation in the finite group is based on the first random value;
  providing the first challenge to at least one device;
  compile a second challenge based on a second random value, the parameter and based on the first challenge or any intermediate value generated as part of the compilation of the first challenge, wherein the second random value has a reduced size compared to the first random value;
  provide the second challenge to the at least one device or another device for authentication of the at least one device or the other device to the host; and
  authenticate the at least one device or the other device based on a response to the second challenge.

19. A system comprising a host and at least one device, wherein the host is arranged to:
  compile a first challenge based on a first random value and a parameter, wherein the compiling of the first challenge is based on an exponentiation in a finite group comprising a basis and an exponent, the basis of the exponentiation in the finite group is based on the parameter, and wherein the exponent of the exponentiation in the finite group is based on the first random value;
  provide the first challenge to the at least one device;
  compile a second challenge based on a second random value, the parameter and based on the first challenge or any intermediate value generated as part of the compilation of the first challenge, wherein the second random value has a reduced size compared to the first random value;
  provide the second challenge to the at least one device or to another device; and
  authenticate the at least one device or the other device based on a response to the second challenge; and
wherein the at least one device is arranged to:
  compile a first response based on the first challenge received; and
  provide the first response to the host, and
wherein the at least one device or the other device is arranged to:
  compile a second response based on the second challenge received; and
  provide the second response to the host for authentication of the at least one device or the other device to the host.

20. A non-transitory computer program product directly loadable into a memory of a digital processor comprising software code portions for performing the steps of the method according to claim 1.

* * * * *